F. CRANE.
Rubber Springs for Stirrups.
No. 147,373. Patented Feb. 10, 1874.
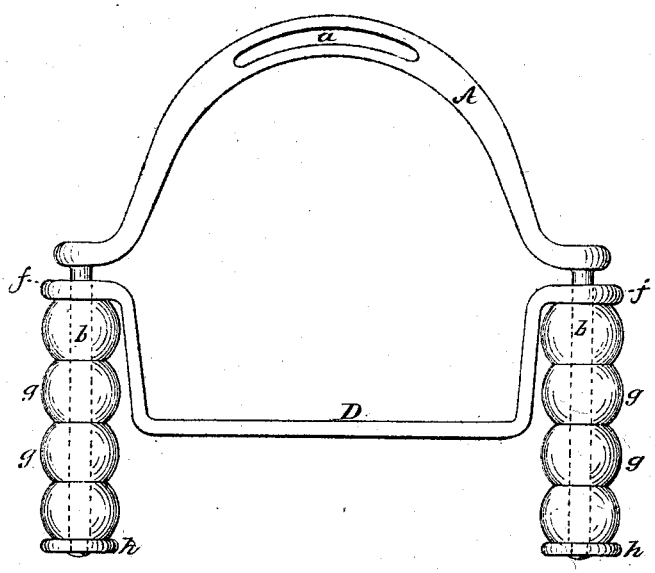
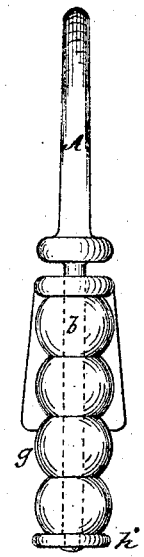
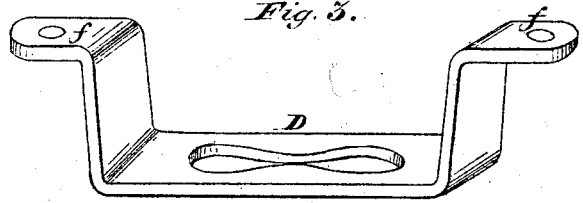
Witnesses:
James L. Norris.
Joseph C. Tiffany
Inventor:
Frederick Crane

UNITED STATES PATENT OFFICE.

FREDERICK CRANE, OF BLOOMFIELD, NEW JERSEY.

IMPROVEMENT IN RUBBER SPRINGS FOR STIRRUPS.

Specification forming part of Letters Patent No. 147,373, dated February 10, 1874; application filed February 2, 1874.

*To all whom it may concern:*

Be it known that I, FREDERICK CRANE, of the town of Bloomfield, in the county of Essex and State of New Jersey, have invented certain new and useful Improvements in Rubber Springs; and I do hereby declare the following to be a full, clear, and exact description of the invention, such as will enable others skilled in the art to which it pertains to make and use it, reference being had to the accompanying drawings, which form part of this specification, in which—

Figure 1 shows a perspective front view, Fig. 2 a side view, and Fig. 3 a perspective view, of the foot-piece of a stirrup.

Heretofore stirrups for saddles have been made with steel or metallic spiral springs arranged between the top bow and foot-piece, or in the strap, so as to give an easy spring to the stirrup; but such metallic springs are objectionable on account of the creaking of the metal.

My invention consists of a vulcanized rubber spring, which is adapted to a stirrup, so as to give an easy spring without noise.

The following description will enable others to make and use my invention.

In the drawing, A is the top or bow of the stirrup, with slot $a$ for the strap, and on each side, as a part of and continuation of the same piece, or as a separate piece, but firmly attached thereto, the rods $b\ b$, with buttons $h\ h$ at lower end of each. D is the bottom piece or tread of the stirrup, of the form shown, or of any equivalent form, having at each end holes $f f$, which slide over the rods $b\ b$. A series of rubber balls, $g\ g\ g\ g$, placed upon each of the rods $b\ b$, and resting upon the buttons $h\ h$, and supporting the piece D, constitute my invention. These rubber balls are made of that kind of spring-rubber which is the spongiest and best adapted to the purpose. In the drawing, I have shown four of these balls on each side; but the number may be increased or diminished, or their shape may be altered. The mode of forming this kind of rubber, being well known to those skilled in rubber manufacture, need not be particularly described. Through the middle of each of these rubber balls is a hole, so that it may slip on the rods $b\ b$. By adjusting the size and number of the rubber balls, any required strength or force of spring may be secured.

I have shown what I regard as the simplest and best form of arrangement of rubber springs to answer the purpose, but do not limit myself to that shown, since this may be varied.

The essential part of my invention is a pair of rubber springs of the shape shown, or other suitable shape, or a single spring so arranged as to give elasticity or spring to the foot-piece of the stirrup, or by attachment to the top of the stirrup, as may be more convenient in a wooden or covered stirrup, to give elasticity to both foot-piece and bow.

Having thus described my invention, what I claim, and desire to secure by Letters Patent of the United States, is—

1. A rubber spring in a stirrup, arranged either above, on the side, or below the foot-piece, so as to give spring to the foot, and to prevent creaking, substantially as set forth.

2. The combination of the two parts of the stirrup and the rubber spring between, substantially as and for the purpose specified.

In testimony that I claim the foregoing I have hereunto set my hand this 28th day of January, 1874.

FREDERICK CRANE.

Witnesses:
 JOSEPH COULT,
 W. P. HAYNE.